March 29, 1966    E. P. HAEN    3,242,905
LIVESTOCK FEEDER
Filed Oct. 1, 1964
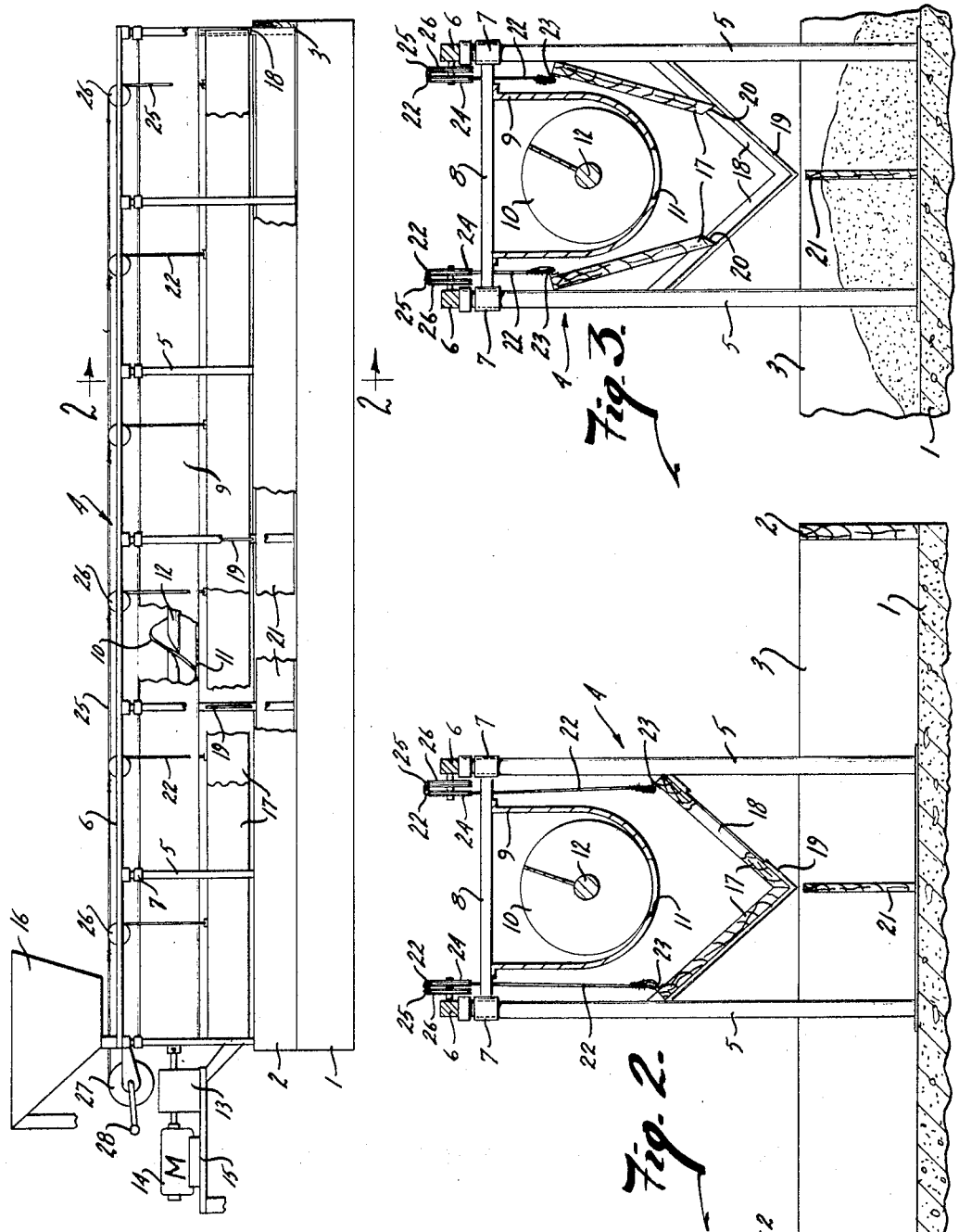
INVENTOR.
EUGENE P. HAEN
BY
Andrus & Starke
Attorneys

United States Patent Office 3,242,905
Patented Mar. 29, 1966

3,242,905
LIVESTOCK FEEDER
Eugene P. Haen, Kaukauna, Wis., assignor, by mesne assignments, to Badger Northland, Inc., Kaukauna, Wis., a corporation of Delaware
Filed Oct. 1, 1964, Ser. No. 400,653
8 Claims. (Cl. 119—56)

This invention relates to a livestock feeding apparatus and more particularly to a bunk feeder for automatically distributing feed to cattle or other livestock.

Recently, there has been considerable interest in automatic feeding devices which are employed to automatically distribute feed to livestock, such as cattle, either in the barnyard or in the barn. In a typical installation on a dairy farm, the feed or silage discharged from the silo is fed directly into a hopper located at one end of a bunk feeder and the feed is then conveyed along the bunk feeder and distributed along the length of the bunk to the livestock.

The present invention is directed to an improved bunk feeder for feeding livestock. The feeder comprises a frame which extends along the feed bunk and supports a conveyor housing having a series of openings in its lower surface. A spiral flight or auger is mounted within the housing and feed introduced into the housing is conveyed by the auger and discharged through the openings along the length of the feed bunk.

Located in spaced relation beneath the conveyor housing are a pair of closure plates which define a generally V-shaped, feed receiving trough. The plates are supported on a series of V-shaped rods which are mounted on the frame and the upper edge of each plate is connected by cables to a winch mechanism. By operating the winch, one or both plates can be raised along the V-shaped guide rods to thereby dump the quantity of feed which has been collected in the trough onto the feed bunk.

With the feeder of the invention, the silage or other feed is discharged from the conveyor housing along the entire length of the feed bunk and is collected in the V-shaped trough defined by the closure plates. When the desired amount of feed has been discharged into the trough, the closure plates are moved upwardly by operation of the winch mechanism to dump the feed along the entire length of the feed bunk. By dumping the feed along the entire length of the feed bunk, the problem of cattle crowding around the forward portion of the bunk feeder is eliminated. Furthermore, as the feed is not released or dumped onto the feed bunk until the feed is distributed throughout the entire length of the bunk, the wind loss is minimized over a bunk feeder in which feed dribbles out of openings along the entire length of the feeder.

By operating only one of the closure plates, the feed can be deflected to either side of the feed bunk and it is thereby possible to feed separate feed lots with different rations from one bunk feeder.

The feeder of the invention can be adapted for use with any size feeding operation and by regulating the height of the conveyor housing above the V-shaped trough, the amount of feed to be distributed can be varied as desired.

Other objects and advantages will appear in the course of the following description.

The drawings illustrate the best modes presently contemplated of carrying out the invention.

In the drawings:

FIG. 1 is a longitudinal view of the feeding apparatus of the invention;

FIG. 2 is a transverse section taken along line 2—2 of FIG. 1 showing the closure plates in the closed position; and FIG. 3 is a view similar to FIG. 2 showing the closure plates in the opened position.

The drawings illustrate a livestock feeding apparatus for automatically distributing feed to cattle or other livestock in the yard. As shown in FIG. 1, the apparatus includes a raised feed bunk 1 having sideboards 2 and end boards 3 to retain the feed on the bunk 1. In most installations the feed bunk may have a length of 50 to 200 feet.

The feeding apparatus comprises a frame 4 which includes a series of vertical supports 5 connected at their upper extremities by horizontal braces 6. A series of collars 7 are adjustably mounted on the vertical supports 5 and the collars carry cross members 8 which extend transversely of the feed bunk.

A conveyor housing 9 is supported from the cross members 8 and a spiral flight or auger 10 is mounted for rotation within the conveyor housing and serves to convey feed through the housing. The housing 9 is provided with a series of openings 11 in the bottom surface through which the feed is discharged to the feed bunk.

The auger 10 can be operated by any conventional drive mechanism. As shown in FIG. 1, the auger shaft 12 is connected through a speed reducing unit 13 to a motor 14 which is mounted on a platform 15 supported by frame 4.

Feed, such as silage is introduced into one end of conveyor housing 9 by a hopper 16 which is supported above the platform 15.

According to the invention, the feed being discharged through the openings 11 in the conveyor housing is collected in a generally V-shaped trough which is formed or defined by a pair of closure plates or doors 17. The plates 17 extend the length of the housing 9 and can be formed of metal, wood or plastic. The end of the plates 17 are supported by generally V-shaped supports 18 formed of angle stock and which are connected between vertical supports 5 at the ends of the feed bunk. The plates 17 rest on the horizontal flanges of the supports 18 and the vertical flanges of the supports 18 prevent longitudinal displacement of the plates.

In addition to the supports 18, a series of generally V-shaped bars 19 are connected between corresponding pairs of vertical supports 5 and serve to support the plates 17 in movement. The bars 19 are preferably fabricated of thin, round stock and the round cross section prevents feed from being collected on the upper surface of the bars and thus insures that the plates 17 will move freely along the surface of the support bars 19.

The lower longitudinal edge of each of the closure plates 17 is beveled, as indicated by 20, so that when the plates are in the lowermost position, the beveled edges 20 will be in abutting relation to provide a complete closure. The beveled edges 20 are located above a divider board 21 which extends longitudinally of the feed bunk 1 and divides the feed bunk into a pair of feeding areas.

According to the invention, the closure plates 17 are moved upwardly by a cable mechanism to dump the feed collected thereon onto the bunk 1. A series of cables 22 are attached to a flange 23 secured to the upper edge of each closure plate 17 and the cables 22 pass over pulleys 24 mounted on frame 4, and the cables 22 along each side of the feeder are spliced to a longitudinal cable 25. The longitudinal cables 25 pass over pulleys 26 which are also mounted with the pulleys 24 on the frame 4.

The end of each of the longitudinal cables 25 is secured to a winch 27 located at the end of the bunk feeder. The winches, as shown in the drawings, can be manually operated by means of handles 28, or alternately, the winches can be motor-driven. By winding the cable 25 on the winch 27 the corresponding cables 22 are pulled upwardly thereby moving the closure plate 17 upwardly to dump the feed onto the feed bunk 1. If both of the cables 25 are wound simultaneously on the winches 27, both plates 17 will be elevated and the feed will be distributed to both sides of the divider board 21. However, if it is desired to feed only to one side of the divider board 21, the corresponding winch is operated which will then raise only one closure plate 17 so that the feed will drop only to that side of the divider board.

In operation, the feed is supplied to the hopper 16 at the end of the conveyor housing 9 either manually or through a conveyor. The auger 10 conveys the feed through the housing 9 and the feed drops downwardly through the openings 11 in the housing and is collected in the V-shaped trough defined by the closure plates 17 which are in the closed or downward position. When the trough has been filled with the desired amount of feed, the winches 27 are operated to thereby raise the closure plates 17 and dump the feed along the entire length of the feed bunk 1. As previously mentioned, if it is desired to feed to only one side of the divider board 21, the corresponding winch is operated to thereby move only one of the closure plates upwardly and dump the feed to that side of the divider board.

After the feed has been dumped onto the bunk 1, the cables 25 are unwound from the winches and the closure plates will fall by gravity back to the lower or closed position as shown in FIG. 2.

As the feed being distributed from the conveyor housing is collected in the V-shaped trough, the loss of feed through wind blowing is minimized over a system in which feed dribbles from a series of openings in the conveyor housing directly onto the feed bunk.

As an additional advantage, the amount of feed being discharged to the feed bunk can be varied by raising and lowering the conveyor housing with respect to the closure plate 17. By raising the conveyor housing 9 through adjustment of the collars 7 the amount of feed which can be received within the trough can be increased, and conversely, by lowering housing 9, the amount of feed will be decreased. This provides a convenient method of metering or measuring the amount of feed to be discharged to the feed bunk.

Various modes of carrying out the invention are contemplated as being within the scope of the following claims particularly pointing out and distinctly claiming the subject matter which is regarded as the invention.

I claim:

1. In a livestock feed apparatus, a feed area, a frame extending upwardly from the feed area with said frame having opposed side portions, a series of guide members connected to each side portion of the frame and extending downwardly at an angle from said side portion toward the longitudinal centerline of said feed area, a closure member slidably mounted on each series of guide members with the lower adjacent longitudinal edges of said closure members in selective abutting engagement when the closure members are in the downward position to thereby provide a generally V-shaped feed receiving trough, means attached to the upper longitudinal edge portion of each closure member for raising and lowering said closure member, and conveying means mounted on the frame and located in spaced relation above said V-shaped through, feed supply means located above said conveying means for supplying feed to said conveying means, feed being discharged from said conveying means and collected in said V-shaped trough and said closure members having an upwardly separated position to space said adjacent longitudinal edges for dumping the feed onto the feed area.

2. In a livestock feed apparatus, a feed bunk area, a frame extending upwardly from the feed area with said frame having opposed side portions, a series of V-shaped guides disposed in spaced relation along the length of the feed area and extending transversely of said feed area, one end of each V-shaped guide being secured to one side portion of the frame and the other end of each V-shaped guide being attached to the other side portion of the frame, a pair of closure members slidably mounted on said guides with the adjacent longitudinal lower edges of said closure members disposed in abutting relation so that said closure members define a generally V-shaped trough, operating means connected to the upper longitudinal edge portion of each closure member for individually raising the closure member to thereby move said adjacent longitudinal edges into spaced dumping relation, conveying means disposed above said V-shaped guides for supplying feed to the entire length of said trough, and feed supply means located above said conveying means for supplying feed to said conveying means, said feed being dumped onto said feed bunk area when said adjacent longitudinal edges are moved into spaced relation.

3. The structure of claim 2, in which the guides have a generally circular cross section to prevent feed from collecting thereon.

4. In a livestock feed apparatus, a feed bunk, a frame extending upwardly from the feed bunk with said frame having opposed side portions, a series of guide members connected to each side portion of the frame and extending downwardly at an angle from said side portion toward the longitudinal centerline of said feed bunk, a closure member slidably mounted on each series of guide members with the lower adjacent longitudinal edges of said closure members in abutting engagement when the closure members are in the downward position to thereby provide a generally V-shaped feed receiving trough, conveying means mounted on the frame and located in spaced relation above said V-shaped trough, feed being discharged from said conveying means and collected in said V-shaped trough, and means for moving the adjacent longitudinal edges of said closure members into spaced relation to thereby dump the feed from the trough to the feed bunk.

5. The structure of claim 4, and including means for raising and lowering said conveying means with respect to said closure members to vary the amount of feed collected in said V-shaped trough.

6. In a livestock feed apparatus, a feed area, a frame extending upwardly from the feed area with said frame having opposed side portions, a series of V-shaped guides disposed in spaced relation along the length of the feed area and extending transversely of said feed area, one end of each V-shaped guide being secured to one side portion of the frame and the other end of each V-shaped guide being attached to the other side portion of the frame, a pair of closure members slidably mounted on said guides with the adjacent longitudinal lower edges of said closure members disposed in abutting relation so that said closure members define a generally V-shaped trough, a generally V-shaped end support located at each end of said frame and extending transversely of said frame, each end support including a generally horizontal surface to support the ends of the closure members and including an upstanding portion disposed longitudinally outward of the corresponding ends of the closure members to prevent longitudinal displacement of said closure members, conveying means mounted on the frame and located in spaced relation above said V-shaped trough, feed being discharged from said conveying means and collected in said V-shaped trough, and means for moving the adjacent longitudinal edges of said closure members into spaced relation to thereby dump the feed from the trough to the feed area.

7. The structure of claim 4, in which the feed area is a raised feed bunk and a divider member extends upwardly from said feed bunk in vertical alignment with the apex of the V-shaped trough and divides the feed bunk into two feeding zones.

8. The structure of claim 2, in which the operating means comprises a series of cables connected to the upper edge of each closure member, a longitudinal cable connected to each of said first named cables, and a winch to wind and unwind said longitudinal cable.

References Cited by the Examiner
UNITED STATES PATENTS

| | | | |
|---|---|---|---|
| 2,981,229 | 4/1961 | Brown | 119—56 |
| 3,029,925 | 4/1962 | Martin et al. | 198—64 |
| 3,103,203 | 9/1963 | Haen | 119—59 |
| 3,123,050 | 3/1964 | Haen | 119—52 |
| 3,144,173 | 8/1964 | France et al. | 119—56 X |

SAMUEL KOREN, *Primary Examiner.*

ALDRICH F. MEDBERY, *Examiner.*